United States Patent [19]

Otani

[11] Patent Number: 4,965,683
[45] Date of Patent: Oct. 23, 1990

[54] CASSETTE LOADING DEVICE FOR RECORDING AND/OR REPRODUCING APPARATUS

[75] Inventor: Takahide Otani, Tokyo, Japan
[73] Assignee: Sony Corporation, Tokyo, Japan
[21] Appl. No.: 326,731
[22] Filed: Mar. 21, 1989

[30] Foreign Application Priority Data

Mar. 28, 1988 [JP] Japan .................................. 63-073553

[51] Int. Cl.$^5$ ...................... G11B 15/02; G11B 15/08; G11B 15/675
[52] U.S. Cl. ......................................... 360/94; 360/71; 360/96.5; 360/96.6
[58] Field of Search ....................... 360/96.5, 96.6, 71, 360/94

[56] References Cited

U.S. PATENT DOCUMENTS

| 4,631,607 | 12/1986 | Katsumata | 360/96.5 |
| 4,664,337 | 5/1987 | Shiratori | 242/199 |
| 4,729,046 | 3/1988 | Steipe et al. | 360/94 |
| 4,754,348 | 6/1988 | Schwieker | 360/94 |
| 4,787,572 | 11/1988 | Rademacher | 242/201 |

Primary Examiner—Robert S. Tupper
Attorney, Agent, or Firm—Ronald P. Kananen

[57] ABSTRACT

A cassette loading device for a recording and/or reproducing apparatus, capable of loading tape cassettes of different sizes and weights, comprises a cassette holder capable of moving between a cassette insertion position and a cassette loading completed position, cassette holder driving means, optical sensors for detecting which type of tape cassette has been inserted into the recording and/or reproducing apparatus, and torque control means for controlling the driving torque of the cassette holder driving means in response to a detection signal indicative of the type of tape cassette, thereby allowing the tape cassette to load at an essentially consistent loading speed regardless of the type of tape cassette. With this construction, the loading device has high positioning accuracy.

15 Claims, 5 Drawing Sheets

CASSETTE LOADING DEVICE FOR RECORDING AND/OR REPRODUCING APPARATUS

BACKGROUND OF THE INVENTION

1. Field of the Invention

The present invention relates to a cassette loading device for a recording and/or reproducing apparatus, and particularly to a cassette loading device in which magnetic tape cassettes of different sizes and weights can be smoothly and precisely loaded to the respective loading positions by a driving force suitable for their respective weights. Specifically, the present invention relates to a cassette loading device including a cassette holder which is capable of moving between a cassette insertion position and a cassette loading completed position.

2. Description of the Prior Disclosure

Recently, various cassette loading devices for magnetic tape cassettes applicable in recording and/or reproducing apparatus have been proposed and developed. For example, digital video tape recorders used at broadcasting stations are constructed so as to accept different sizes of tape cassettes having various maximum recording times. These tape cassettes contain magnetic tape 19 mm in width, 16 micron in thickness, 190 m (S size), 587 m (M size), or 1311 m (L size) in length. The respective sizes of tape cassettes have 11 min, 34 min, and 76 min rec/play times. The size of each magnetic tape cassette casing is defined in accordance with the length of the magnetic tape. The S size magnetic tape cassettes are 172 mm in length and 109 mm in width. The M size magnetic tape cassettes are 254 mm in length and 150 mm in width. The L size magnetic tape cassettes are 66 mm in length and 206 mm in width. The above prior art cassette loading apparatus can load different sizes of tape cassettes to the predetermined loading completed position. One such cassette loading apparatus has been disclosed in the U.S. Pat. No. 4,631,607.

Alternatively, cassette loading apparatus, which are capable of moving a reel driving device so as to match the interval, between the pair of reels in the cassette, by detecting the size of the tape cassette have been disclosed in U.S. Pat. Nos. 4,664,337 and 4,787,572.

Such prior art cassette loading apparatus are driven at a constant torque by a driving motor regardless of the size of the tape cassette. The weight of L size tape cassettes is substantially 1 kg greater than the weight of S size tape cassettes. Therefore, the driving torque suitable for loading the L size tape cassettes is larger than the driving torque suitable for the S size tape cassettes. Due to this excessive torque, the S size tape cassettes are driven too forcibly into the recording and/or reproducing apparatus, which tends to result in damage to the driving system.

Conversely, when the L size tape cassettes are inserted into the recording and/or reproducing apparatus with the driving torque suitable for the S size tape cassettes, the loading speed is slow. Moreover, insufficient driving torque results in deterioration in the positioning accuracy of the cassette loading device. As a result, the tape cassette is not precisely positioned in the loading completed position. If the magnetic tape is extracted from the tape cassette casing, while the cassette is improperly aligned, damage to the magnetic tape occurs.

If the driving torque is set to the value appropriate for the M size tape cassettes, the torque is greater than the optimum torque for the S size tape cassettes and less than the optimum torque for the L size tape cassettes. In this case, the loading apparatus cannot operate satisfactorily in loading the L and S size cassettes.

SUMMARY OF THE INVENTION

It is, therefore, a primary object of the present invention to provide a cassette loading device for a recording and/or reproducing apparatus in which the torque of a driving motor used for loading is adjusted in accordance with the weight of each size of a tape cassette.

It is another specific object of the invention to provide a cassette loading device having high positioning accuracy, thereby preventing damage to the driving motor and decreasing loading time.

In order to accomplish the aforementioned and other objects of the invention, a cassette loading device for a recording and/or reproducing apparatus, capable of accepting tape cassettes of a plurality of mutually different sizes, according to the invention, comprises a cassette holder being capable of moving between an insertion position, in which the tape cassette is inserted into the recording and/or reproducing apparatus, and a loading completed position, in which the tape cassette is positioned onto a positioning means and the pair of tape reels within the cassette engage with a reel driving means, cassette holder driving means for driving the cassette holder, detection means for detecting the kind of tape cassette that is inserted into the recording and/or reproducing apparatus, and torque control means for controlling the driving torque of the cassette holder driving means in response to a detection signal which is outputted from the detection means and indicative of the kind of tape cassette that has been inserted into the cassette holder. The detection means comprise at least one optical sensor. One of the optical sensors is arranged within the plane of projection of the minimum size tape cassette and is preferably provided at a position near the back of the cassette holder, opposite from the cassette receiving opening of the cassette holder. The torque control means applies a voltage which varies depending upon the detection signal to the cassette holder driving means.

A cassette loading device of the invention further comprises pressure control means for positioning the tape cassette onto the positioning means at a predetermined pressure, which pressure control means is provided between the cassette holder and the cassette holder driving means.

According to another aspect of the invention, a cassette loading device for a recording and/or reproducing apparatus, capable of receiving tape cassettes of a plurality of sizes and/or reel spacings, comprises a cassette holder being capable of moving between an insertion position, in which the tape cassette is inserted into the recording and/or reproducing apparatus, and a loading completed position, in which the cassette tape is positioned onto a positioning means and the pair of tape reels therein engage with a pair of reel driving means, cassette holder driving means for driving the cassette holder, detection means for detecting the kind of tape cassette that has been inserted into the recording and/or reproducing apparatus, torque control means for controlling the driving torque generated by the cassette holder driving means in response to a detection signal which is outputted from the detection means and indicative of the kind of tape cassette that has been inserted, shifting means capable of moving the pair of reel driving means, and shifting control means for controlling the shifting means in response to the detection signal in such a manner that a pair of driving shafts of the reel driving means engage with the pair of reels of the inserted tape cassette.

According to a further aspect of the invention, a cassette loading device for a recording and/or reproducing apparatus, capable of loading tape cassettes of a plurality of sizes, weights, and/or reel spacings, comprises a cassette holder being capable of moving between an insertion position, in which the tape cassette is inserted into the recording and/or reproducing apparatus, and a loading completed position, in which the tape cassette is positioned onto a positioning means and the pair of tape reels engage with a pair of reel driving means, cassette holder driving means for driving the cassette holder, detection means for detecting which kind of tape cassette has been inserted into the recording and/or reproducing apparatus, torque control means for controlling the driving torque generated by the cassette holder driving means in response to a detection signal which is outputted from the detection means and is indicative of the kind of tape cassette that has been inserted into the cassette holder, shifting means capable of moving the pair of reel driving means, and shifting control means for controlling the shifting means in response to the detection signal in such a manner that a pair of driving shafts of the reel driving means engage with the pair of reels of the tape cassette. Preferably, the detection means comprises at least one optical sensor, at least one piezoelectric gauge, and/or at least one strain gauge.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Referring now to FIGS. 1 to 4, the preferred embodiment of a cassette loading device is applicable to a front loading type video tape recorder.

Figure 1:
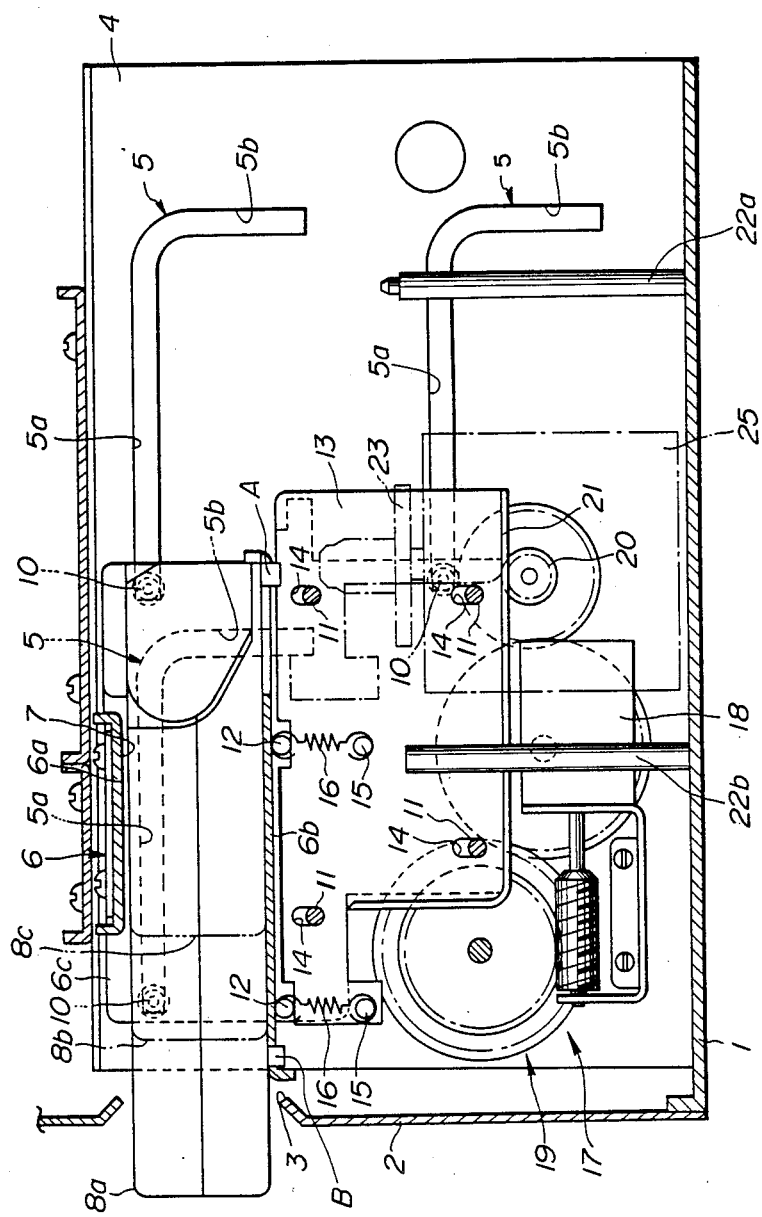
FIG. 1 is a vertical sectional view showing a side portion of a cassette loading device of the disclosed embodiment of the invention, in which a magnetic tape cassette is positioned in an insertion position.
Figure 2:
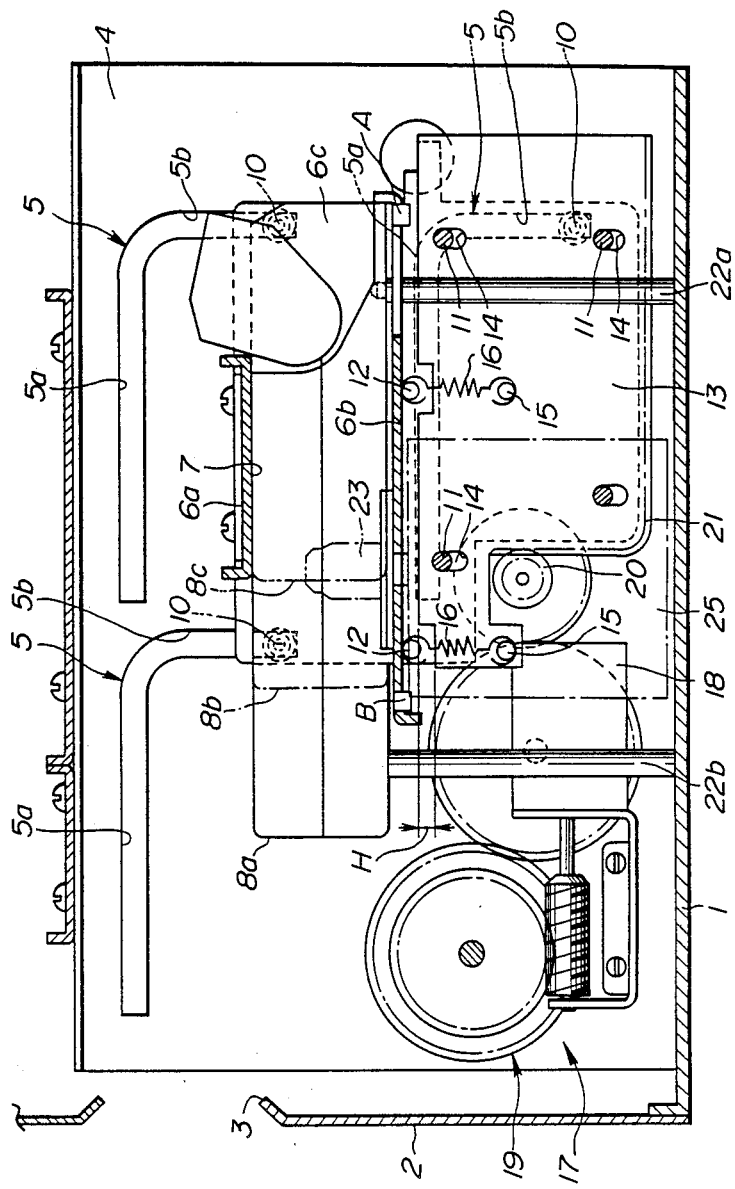
FIG. 2 is a vertical sectional view showing a front portion of the cassette loading device according to the invention, in which the magnetic tape cassette is positioned in a loading completed position.

As shown in FIGS. 1 and 2, a front panel 2 is provided in the front side of a mechanical chassis 1. The front panel 2 has a substantially rectangular cassette insertion opening 3 therein.

Figure 3:
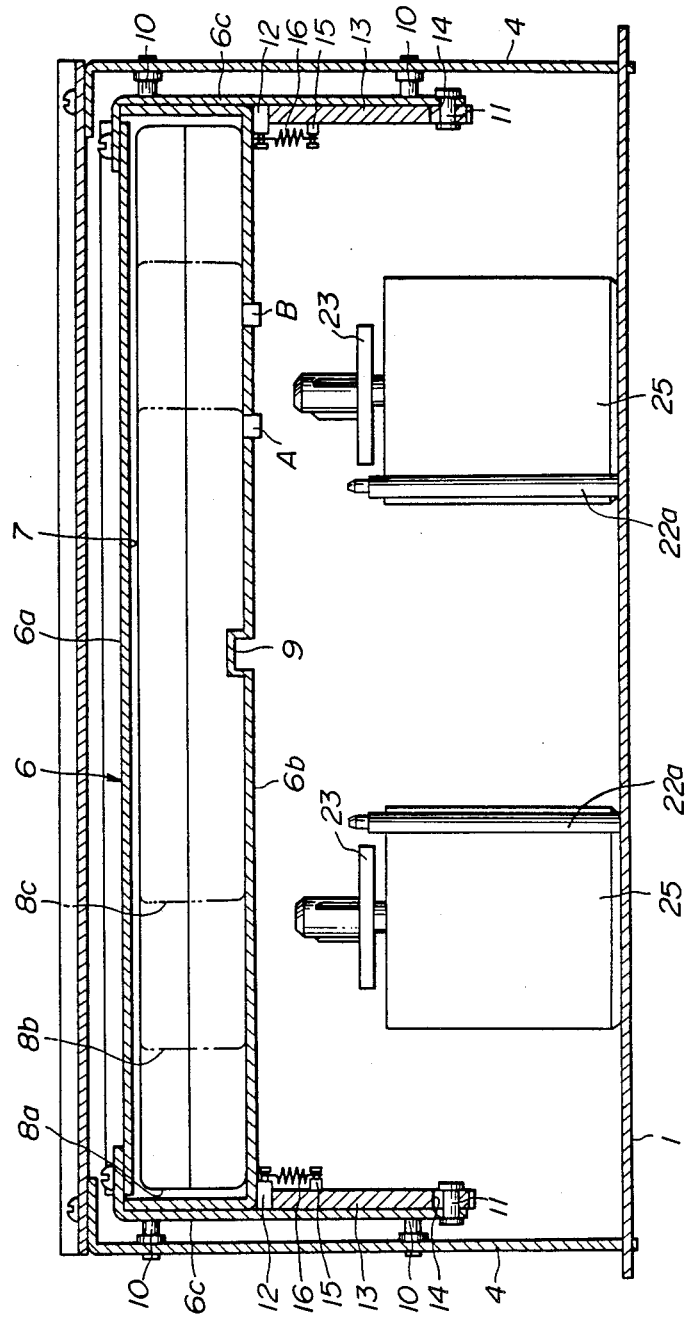
FIG. 3 is a vertical sectional view showing a front portion of the cassette loading device of the embodiment, in which the magnetic tape cassette is positioned in the insertion position.
Figure 4:
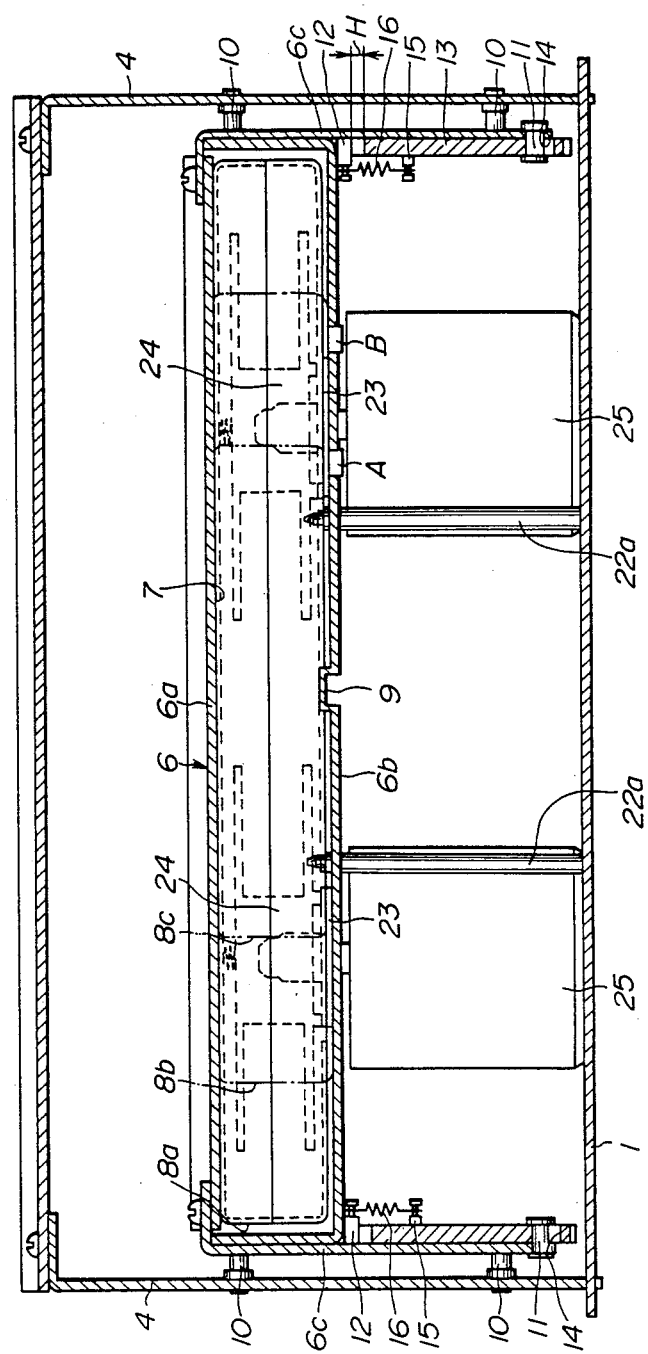
FIG. 4 is a sectional view showing a side portion of the cassette loading device of the embodiment, in which the magnetic tape cassette is positioned in the loading completed position.

As best shown in FIGS. 3 and 4, a pair of lifting guide plates 4 are vertically fixed in the right and left sides of the mechanical chassis 1. As clearly seen in FIGS. 1 and 2, three substantially L-shaped guide grooves 5 are formed in the pair of guide plates 4 so as to guide a cassette holder 6 mentioned below. The three guide grooves are of the same shape. The guide grooves 5 comprise horizontal sections 5a and vertical sections 5b.

In FIGS. 1 to 4, the cassette holder 6 is provided between the pair of lifting guide plates 4. The cassette holder 6 is integrally formed with an upper plate 6a, a bottom plate 6b, and a pair of side plates 6c. A substantially rectangular tape cassette insertion chamber 7 is defined by the internal walls of the cassette holder 6. The cassette insertion chamber 7 is constructed in such a manner that the cassette holder 6 is capable of holding different sizes of magnetic tape cassettes, namely the L size tape cassettes 8a, the M size tape cassettes 8b, and the S size tape cassettes 8c. As best seen in FIGS. 3 and 4, when one of the tape cassettes 8a to 8c is inserted into the cassette insertion chamber 7, it is aligned by a center guide portion 9 provided on the bottom plate 6b.

The pair of side plates 6c extend downward from the bottom plate 6b. Three pairs of guide pins 10 project horizontally from the outside of each side plate 6c. The three pairs of guide pins 10, respectively, engage with the three pairs of guide grooves 5 of the pair of lifting guide plates 4 with the result that the cassette holder 6 moves along a predetermined loading path defined by the three pairs of guide grooves 5. In this manner, the cassette holder 6 is supported by the lifting guide plate at both sides thereof. On the other hand, four pairs of guide pins 11 and two pairs of spring hangers 12 project from the inside of each side plate 6c.

As clearly shown in FIG. 1, a pair of rack plates 13 are so arranged as to come into contact with the inside surface of each side plate 6c. The rack plates 13 have four pairs of vertically extending elongated holes 14, respectively. The elongated holes 14, respectively, engage with the outside guide pins 11 of the side plates 6c. The pair of rack plates 13 have two pairs of spring hangers 15, respectively. Two pairs of tension springs 16 are hung between the spring hangers 12 and 15, respectively, and therefore the rack plate 13 is normally biased upward by the spring force in such a manner that the upper surface of the rack plate 13 mates with the outer peripheral surface of the spring hanger 12 of the cassette holder 6. In this construction, the relative displacement between the rack plate 13 and the cassette holder 6 is restricted within the range in which the guide pin 11 can move within the elongated hole 14. The pair of rack plates 13 further include a pair of continuous L-shaped rack portions 21 extending over the front and bottom ends.

A holder driving means 17 comprises a cassette holder driving motor 18 mounted on the mechanical chassis 1 and a group of gears 19 for changing the driving torque generated by the motor 18. The rack portion 21 engages with a pinion gear 20 which serves as an output gear of the group of gears 19. The configuration of the L-shaped rack portion 21 allows the rack to remain in engagement with the pinion 20 as the holder moves through the path defined by the guide grooves 5. When the pinion gear 20 rotates clockwise in engagement with the rack portion 21, the cassette holder 6 moves from the insertion position as shown in FIGS. 1 and 3 to the loading completed position as shown in FIGS. 2 and 4. Conversely, when the pinion gear 20 rotates counterclockwise in engagement with the rack portion 21, the cassette holder 6 moves from the loading completed position to the insertion position.

As shown in FIGS. 1 to 4, a pair of positioning rods 22a and a pair of positioning rods 22b projects upwardly from the upper surface of the mechanical chassis 1. The pair of positioning rods 22a are provided for positioning the respective L, M, and S sizes of tape cassettes. The positioning rods 22a have substantially truncated conical top ends which insert into a positioning hole formed in the lower surface of the tape cassette. The pair of positioning rods 22b are provided only for positioning the L size tape cassettes. The positioning rod 22b has a flat surface at the top end thereof so as to support the bottom surface of the L size tape cassettes.

A pair of reel bases 23 and a pair of reel driving motors 25 are slidably provided on the upper surface of the mechanical chassis 1. When either of the tape cassettes 8a to 8c is positioned in the loading completed position, the pair of positioning rods 22a position the cassette and the pair of reel bases 23 and the pair of motors 25 slide to a desired engagement position in which the reel driving shafts of the reel bases 23 engage with a pair of tape reels 24 of the tape cassette. Furthermore, in the case of the L size tape cassettes, the positioning rods 22b support the bottom surface. On the other hand, in the cases of the M or S size tape cassettes, another pair of positioning rods (not shown) mounted on the pair of reel bases 23 support the bottom surface. Although it is not shown in the drawings, the reel bases 23 and the motors 25 are moved by a drive mechanism which has a driving motor 26, which is of a conventional well known construction, and therefore, has been neglected from the drawings for simplification of the drawings and disclosure.

Figure 5:
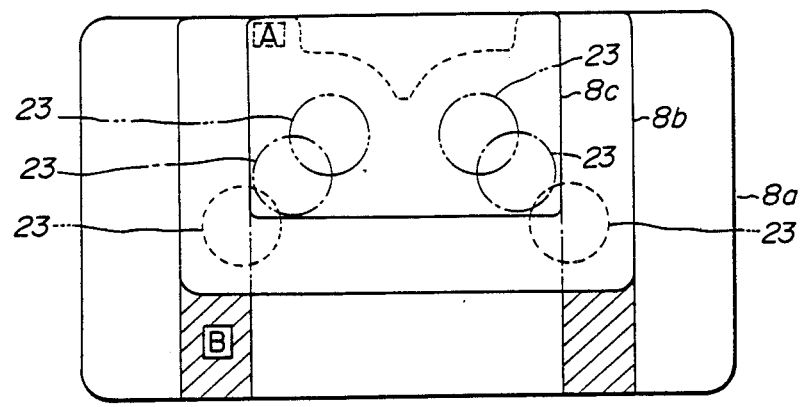
FIG. 5 is a schematic plan view illustrating the relationship between the magnetic tape cassette, a pair of sensors for detecting the size of the cassette, and a pair of reel bases.

As shown in FIGS. 1 to 4, two optical sensors A and B are added in the bottom surface 6b of the cassette holder 6 so as to identify the size of the cassette inserted into the video tape recorder. FIG. 5 shows the three sizes of tape cassettes and their relationship to the sensors A and B.

As clearly shown in FIG. 5, the sensor A is arranged so as to detect insertion of cassettes of all sizes. Therefore, the sensor A is positioned within the plane of projection of the S size tape cassette. Preferably, the sensor A is positioned in the vicinity of the tape access opening of the tape cassette, so that the sensor A can also detect whether the tape cassette is perfectly aligned in the cassette holder 6. On the other hand, the sensor B is arranged near the substantially rectangular opening of the cassette holder 6, within the range defined by the hatched areas. In this arrangement, when the S size tape cassette 8c is inserted into the cassette holder 6, the sensor B never outputs a detection signal. Alternatively, when the M size tape cassette 8b is inserted into the cassette holder 6, the sensor B outputs a momentary detection signal as it is interrupted by the M size tape cassette as it moves from the insertion position to the loading completed position.

Figure 6:
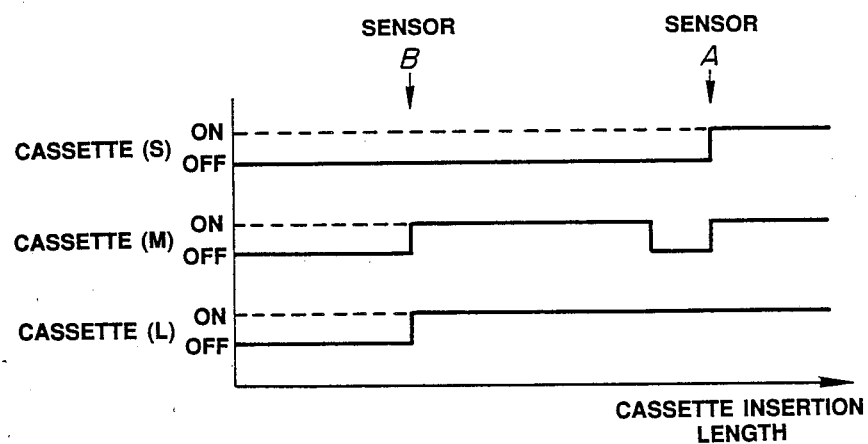
FIG. 6 is a timing chart showing the signal output from the pair of sensors in response to the size of each tape cassette.

When an L size tape cassette 8a is inserted into the cassette holder 6, the sensor B continuously outputs a detection signal from the beginning of the insertion of the tape cassette to the end of the insertion thereof. FIG. 6 shows the wave form of the signal output from the sensors A and B in response to the insertion length of the tape cassette.

Figure 7:
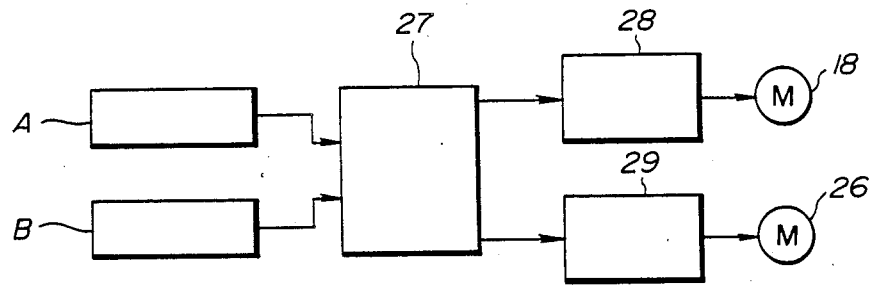
FIG. 7 is a block diagram showing the essential parts of the cassette loading device of the invention.

As shown in FIG. 7, a discrimination means 27 receives detection signals from the two sensors A and B and then deduces the size of the tape cassette on the basis of output waveforms shown in FIG. 6. Subsequently, the discrimination means 27 outputs the control signals to a first driving circuit 28, which is provided for driving the cassette holder driving motor 18, and a second driving circuit 29, which is provided for driving the reel base sliding motor 26.

The first driving circuit 28 applies a suitable voltage to the cassette holder driving motor 18 according to the control signal indicative of the size of the inserted tape cassette. The voltage is selected with consideration of the size and weight of the tape cassettes 8a to 8c. In other words, the voltage is selected in such a manner that the loading speed of the cassette holder 6 becomes essentially constant, thereby causing rapid loading and precise positioning accuracy.

On the other hand, the second driving circuit 29 drives the reel base sliding motor 26 in such a manner that the reel bases 23 and the reel driving motors 25 are positioned in one of the three engagement positions in response to the control signal. In FIG. 5, the L, M, and S size tape cassette reel hub positions, respectively, are shown by a dotted line, a single chain line, and a two-dot chain line.

The operation of the cassette loading device of the preferred embodiment is as follows:

One of the three different types of tape cassettes 8a to 8c is inserted through the cassette insertion opening 3 into the video tape recorder;

The sensors A and B output the detection signals to the discrimination means 27 depending upon the type of the inserted tape cassette;

The discrimination means deduces the type of the tape cassette that has been inserted, in response to the signals from the sensors, and then outputs the control signals to the first and second driving circuits 28 and 29, respectively;

The first driving circuit 28 applies the voltage to the cassette holder driving motor 18 according to the control signal from the discrimination means 27, and as a result the cassette holder 6 moves along with the inserted tape cassette from the insertion position of FIGS. 1 and 3 to the loading completed position of FIGS. 2 and 4;

The second driving circuit 29 drives the reel base sliding motor 26 according to the control signal from the discrimination means, and as a result the reel bases 23 and the reel driving motors 25 slide to the predetermined engagement position as shown in FIG. 5.

When the tape cassette is the L size tape cassette, the lower surface of the cassette mates with the two pairs of positioning rods 22a and 22b and the pair of reel shafts are inserted into the pair of tape reels. On the other hand, when the tape cassette is the M or S size, the lower surface of the cassette mates with the pair of positioning rods 22a and the positioning rods (not shown) mounted on the reel bases and the reel shafts are inserted into the reels. Under this condition, the cassette holder 6 is stopped, while the lower surface of the bottom plate 6b still comes into contact with the upper surfaces of the rack plates 13. Thereafter, the rack plates 13 are moved downward by the output torque from the pinion gear 20 to the maximum relative displacement defined by the guide groove 14 and the guide pin 11. Therefore, the two pairs of tension springs 16 extend, and as a result the upper plate 6a of the cassette holder is pressed downwardly against the upper surface of the tape cassette by the spring force. In this way, the tape cassette is urged onto the positioning rods at a suitable pressure.

As set forth above, the tension springs function as a pressure limiter for positioning the tape cassette and as a buffer for buffering slight shock caused by fluctuation of the driving torque outputted from the pinion gear 20.

When the cassette loading device of the embodiment is operated in the eject mode, the cassette holder driving motor 18 rotates in the reverse direction and the cassette holder 6 moves from the loading completed position to the insertion position at the driving torque most suitable for the type of tape cassette received therein.

As will be appreciated from the above, since the driving torque generated by the motor 18 is adjusted in accordance with the type of the tape cassette inserted into the cassette holder 6, the tape cassette is loaded at a substantially constant loading speed regardless of the type of the tape cassette. As a result, the tape cassette mates with the positioning rods at an essentially constant pressure and the pair of reel shafts of reel bases are smoothly inserted into the pair of reels. This results in high positioning accuracy. Furthermore, the constant loading speed prevents the drive gears and cassette holder driving motor from being damaged by reaction force due to shock caused by excessive loading speed. According to the cassette loading device of the invention, the tape cassette is ejected at a substantially constant rate of ejection from the cassette insertion opening in the eject mode.

In this embodiment, with only two optical sensors, the cassette loading device can deduce what type tape cassette has been inserted and judge whether the tape cassette is properly inserted into the cassette holder.

Although the cassette loading device of the embodiment according to the invention deduces the type of tape cassette by detecting its size, the deduction may be performed by detecting the weight of the tape cassette or by reading identification information marked on the tape cassette.

What is claimed is:

1. A cassette loading device for a recording and/or reproducing apparatus, capable of loading tape cassettes of a plurality of sizes, comprising;
   a cassette holder capable of moving between an insertion position, in which said tape cassette is inserted into said recording and/or reproducing apparatus, and a loading completed position, in which a tape cassette is positioned onto a positioning means and a pair of tape reels engage with a reel driving means;
   cassette holder driving means for driving said cassette holder;
   detection means for detecting which size of tape cassette has been inserted into said recording and/or reproducing apparatus; and
   torque control means for controlling the driving torque of said cassette holder driving means in response to a detection signal which is outputted from said detection means and indicative of which size of tape cassette has been inserted.

2. A cassette loading device as set forth in claim 1, wherein said detection means comprise at least one optical sensor.

3. A cassette loading device as set forth in claim 2, wherein an optical sensors is arranged within the plane of projection of the minimum size tape cassette, and preferably provided at a position near the back of said cassette holder, opposite from said cassette holder.

4. A cassette loading device as set forth in claim 1, wherein a voltage output by said torque control means varies depending upon said detection signal.

5. A cassette loading device as set forth in claim 1, which further comprises pressure control means for urging said tape cassette onto said positioning means at a predetermined pressure, said pressure control means being provided between said cassette holder and said cassette holder driving means.

6. A cassette loading device for a recording and/or reproducing apparatus, capable of loading tape cassettes of a plurality of sizes and/or reel spacings, comprising:
   a cassette holder capable of moving between an insertion position, in which said tape cassette is inserted into said recording and/or reproducing apparatus, and a loading completed position, in which said tape cassette is positioned onto a positioning means and tape reels of said cassette engage with a pair of reel driving means;
   cassette holder driving means for driving said cassette holder;
   detection means for detecting which kind of tape cassette has been inserted into said recording and/or reproducing apparatus;
   torque control means for controlling the driving torque generated by said cassette holder driving means on the basis of a detection signal which is outputted from said detection means and indicative of which kind of tape cassette has been inserted into said cassette holder;
   shifting means capable of moving said pair of reel driving means; and
   shifting control means for controlling said shifting means, in response to said detection signal, in such a manner that a pair of driving shafts of said reel driving means engage with the pair of reels of said tape cassette.

7. A cassette loading device as set forth in claim 6, wherein said detection means comprise at least one optical sensor.

8. A cassette loading device as set forth in claim 7, wherein an optical sensor is arranged within the plane of projection of the minimum size tape cassette, and preferably provided at a position near the back of said cassette holder, opposite from said cassette holder.

9. A cassette loading device as set forth in claim 6, wherein said torque control means outputs a voltage which varies depending upon said detection signal.

10. A cassette loading device as set forth in claim 6, which further comprises pressure control means for urging said tape cassette onto said positioning means at a predetermined pressure, said pressure control means being provided between said cassette holder and said cassette holder driving means.

11. A cassette loading device for a recording and/or reproducing apparatus, capable of loading tape cassettes of a plurality of sizes, weights, and/or reel spacings, comprising:

a cassette holder capable of moving between an insertion position, in which said tape cassette is inserted into said recording and/or reproducing apparatus, and a loading completed position, in which said tape cassette is urged onto a positioning means and a pair of tape reels engage with a pair of reel driving means;

cassette holder driving means for driving said cassette holder;

detection means for detecting which type of tape cassette has been inserted into said recording and/or reproducing apparatus;

torque control means for controlling the driving torque generated by said cassette holder driving means according to a detection signal, outputted from said detection means, indicative of which type of tape cassette has been inserted into said cassette holder;

shifting means capable of moving said pair of reel driving means; and shifting control means for controlling said shifting means in response to said detection signal in such a manner that a pair of driving shafts of said reel driving means engage with said pair of tape reels of said tape cassette which has been inserted into said cassette holder.

12. A cassette loading device as set forth in claim 11, wherein said detection means comprises at least one optical sensor, at least one piezoelectric gauge, and/or at least one strain gauge.

13. A cassette loading device as set forth in claim 12, wherein an optical sensor is arranged within the plane of projection of the minimum size tape cassette, and preferably provided at a position near the back of said cassette holder, opposite from said cassette holder 14. A cassette loading device as set forth in claim 11, wherein said torque control means outputs a voltage which varies depending upon said detection signal.

15. A cassette loading device as set forth in claim 11, which further comprises pressure control means for urging said tape cassette onto said positioning means at a predetermined pressure, said pressure control means being provided between said cassette holder and said cassette holder driving means.

* * * * *